(12) United States Patent
Migaldi

(10) Patent No.: US 10,080,175 B1
(45) Date of Patent: Sep. 18, 2018

(54) PRE-STEERING TRAFFIC WITHIN A TELECOMMUNICATIONS NETWORK

(71) Applicant: T-Mobile USA, Inc., Bellevue, WA (US)

(72) Inventor: Scott Francis Migaldi, Cary, IL (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 15/604,592

(22) Filed: May 24, 2017

(51) Int. Cl.
*H04W 36/00* (2009.01)
*H04W 36/26* (2009.01)
*H04W 36/06* (2009.01)
*H04W 36/24* (2009.01)
*H04W 36/38* (2009.01)
*H04W 36/04* (2009.01)
*H04W 36/32* (2009.01)

(52) U.S. Cl.
CPC .......... *H04W 36/26* (2013.01); *H04W 36/04* (2013.01); *H04W 36/06* (2013.01); *H04W 36/245* (2013.01); *H04W 36/32* (2013.01); *H04W 36/385* (2013.01)

(58) Field of Classification Search
None
See application file for complete search history.

(56) References Cited

U.S. PATENT DOCUMENTS

| | | | |
|---|---|---|---|
| 2004/0102195 A1* | 5/2004 | Naghian | H04W 4/02 455/456.1 |
| 2007/0213067 A1* | 9/2007 | Li | H04W 36/04 455/444 |
| 2010/0128694 A1* | 5/2010 | Choi-Grogan | H04W 36/0027 370/331 |
| 2012/0122448 A1* | 5/2012 | Mueck | H04W 28/24 455/424 |
| 2013/0165130 A1* | 6/2013 | Wu | H04W 36/08 455/444 |
| 2013/0225171 A1* | 8/2013 | Singh | H04W 36/245 455/436 |
| 2014/0045505 A1* | 2/2014 | Henry | H04W 36/0061 455/444 |
| 2014/0187243 A1* | 7/2014 | Rune | H04W 36/04 455/436 |
| 2017/0171793 A1* | 6/2017 | Hamilton | H04W 36/38 |

* cited by examiner

*Primary Examiner* — Ajit Patel
(74) *Attorney, Agent, or Firm* — Perkins Coie LLP

(57) ABSTRACT

Systems and methods are described herein for pre-steering traffic within a telecommunications network. In some embodiments, the systems and methods pre-steer traffic by steering user devices to optimal or suitable frequency bands of a network before the user devices begin streaming content and/or performing other actions via the network.

19 Claims, 5 Drawing Sheets

PRE-STEERING TRAFFIC WITHIN A TELECOMMUNICATIONS NETWORK

BACKGROUND

A telecommunications network is established via a complex arrangement and configuration of many cell sites that are deployed across a geographical area. For example, there may be different types of cell sites (e.g., macro cells, microcells, and so on) positioned in a specific geographical location (e.g., a city, neighborhood, and so on), in order to provide adequate, reliable coverage for mobile devices (e.g., smart phones, tablets, and so on) via different frequency bands configured to provide different coverage types. The devices may seek access to the telecommunications network for various services provided by the network, such as services that facilitate the transmission of data over the network and/or provide content to the devices.

Mobile electronic devices (such as smart phones, personal digital assistants, computer tablets, and so on) are ubiquitous. Mobile devices provide advanced computing capabilities and services to users, such as voice communications, text and other messaging communications, video and other multimedia communications, streaming services, and so on. Often, users, via their mobile devices, access such services as customers or subscribers of telecommunications carriers, which provide telecommunications networks within which the users make voice calls, send text messages, send and receive data, consume content, and so on.

BRIEF DESCRIPTION OF THE DRAWINGS

Embodiments of the present technology will be described and explained through the use of the accompanying drawings.

Figure 1:
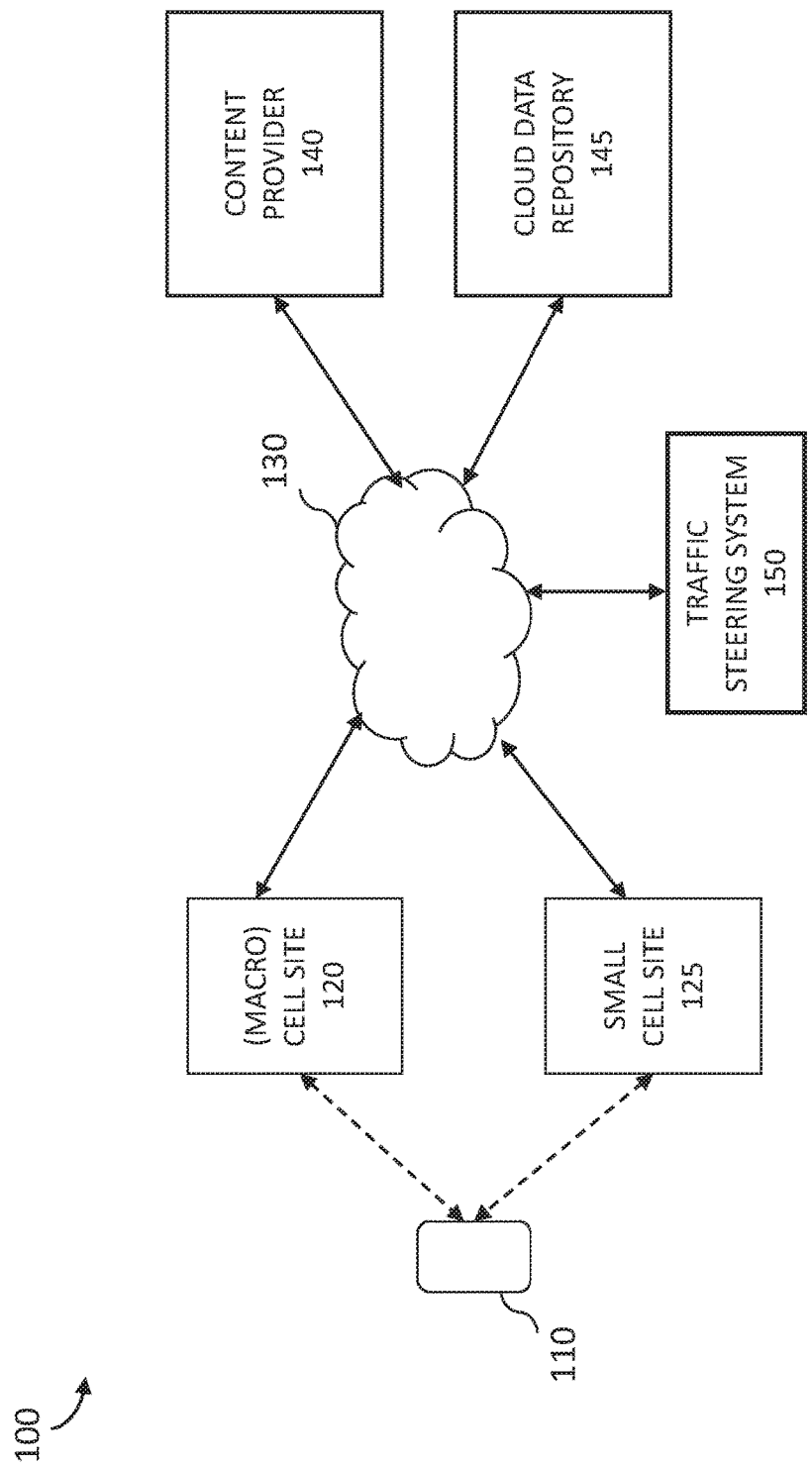
FIG. 1 is a block diagram illustrating a suitable computing environment within which to steer traffic within a telecommunications network.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Systems and methods are described herein for pre-steering traffic within a telecommunications network. For example, the systems and methods may determine a user, via his/her user device, is about to perform an action requiring a certain quality of service (QoS), such as an action to stream content to his/her device, an action to download or otherwise receive a large amount of data, and so on.

Before the action is performed, the systems and methods identify one or more frequency bands provided by the telecommunications network that are available to the user and that provide a suitable or optimal QoS, and handover or otherwise transfer the user device from a current frequency band (e.g., provided by one access point) to the identified frequency band (e.g., provided by a different access point). Then, the communications network facilitates the performance of the action with a high or suitable quality of service, from initiation of the action (e.g., once the user selects content to stream to the user device) through completion of the action.

In some embodiments, the systems and methods pre-steer traffic in a telecommunications network via a user intent module that receives a message from a user device identifying an intended operation to be performed by the user device, a location module that obtains information identifying a predicted geographical location of the user device during performance of the intended operation, and a steering module that identifies a frequency band provided by the telecommunications network suitable for providing a certain or minimum quality of service (QoS) to the user device during performance of the intended operation at the predicted geographical location. This causes a switching, transfer, or handover of the user device to be performed from a current frequency band via which the user device is connected to the telecommunications network to the identified frequency band that is suitable to provide the certain quality of service to the user device during the performance of the intended operation.

In some embodiments, a user device, such as a mobile device, may perform various operations when connecting to a telecommunications network via a suitable access site (for a predicted use of the device), including determining that a user associated with the mobile device has launched a mobile application of the mobile device that performs operations requiring a certain network quality of service (QoS). The user device then accesses information stored within a database of the mobile device that identifies operations previously performed by the mobile application, generates a message to send to the telecommunications network that includes a request to provide a frequency band to the mobile device having the certain network quality of service, and sends the message to the telecommunications network before commencing performance of the operations via the mobile application.

Thus, in some embodiments, the systems and methods pre-steer traffic by steering user devices to optimal or suitable frequency bands of a network before the user devices begin streaming content and/or performing other actions via the network, among other benefits. For example, such pre-steering of traffic may prevent or reduce the presentation of video and other content to users of device with interruptions or other low quality issues, because the systems and methods, in advance of presenting the content, steer the user devices to appropriate, suitable, or available access sites to the network, which then provide a desired quality of service when the content presentation commences.

In the following description, for the purposes of explanation, numerous specific details are set forth in order to provide a thorough understanding of embodiments of the present technology. It will be apparent, however, that embodiments of the present technology may be practiced without some of these specific details.

Examples of Suitable Telecommunications Networks

As described herein, in some embodiments, the systems and methods connect or direct user devices to frequency (radio) bands of a telecommunications network that provide a suitable or appropriate quality of service (QoS) to the user devices for predicted or intended operations, such as content streaming, data transfer, video or audio communications, and so on. In some cases, such connection or direction techniques provide for a cognitive pre-steering of traffic over the telecommunication network, among other benefits.

FIG. 1 is a block diagram illustrating a suitable computing environment 100 within which to steer traffic within a telecommunications network.

One or more user devices 110, such as mobile devices or user equipment (UE), associated with users (such as mobile phones (e.g., smartphones), tablet computers, laptops, and so on) receive and transmit data, stream content, and/or perform other communications or receive services over a telecommunications network 130, which is accessed by the user device 110 over one or more cell sites 120, 125. For example, the mobile device 110 may access a cell site at a geographical location that includes the cell site, in order to transmit and receive data (e.g., stream or upload multimedia content) from various entities, such as a content provider 140 and/or cloud data repository 145 on the network 130 and via the cell site 110.

The cell sites may include macro cell sites 120, such as base stations, small cell sites 125, such as picocells, microcells, or femtocells, and/or other network access component or sites. The cell cites 120, 125 may store data associated with their operations, including data associated with the number of types of connected users, data associated with the provision and/or utilization of a spectrum, radio band, frequency band, and so on, provided by the cell sites 120, 125, and so on. The cell sites 120, 125 may monitor their use, such as the provisioning or utilization of physical resource blocks (PRBs) provided by a cell site physical layer. For example, a cell site 120 having a channel bandwidth of 5 MHz provides 25 available physical resource blocks through which data may be transmitted to/from the user device 110.

Other components provided by the telecommunications network 130 may monitor and/or measure the operations and transmission characteristics of the cell sites 120, 125 and other network access components. For example, the network 130 may provide a network monitoring system, via a network resource controller (NRC) or network performance and monitoring controller, or other network control component, in order to measure and/or obtain the data associated with the utilization of cell sites 120, 125 when data is transmitted within a LTE telecommunications network.

In some embodiments, the computing environment 100 includes a traffic steering system 150 configured to steer, direct, or control traffic within the network 130, such as by pre-steering traffic between the mobile device 110, one or both of the cell sites 120, 125, and various endpoints of the network 130, such as the content provider 140 and/or the data repository 145.

For example, as described herein, the traffic steering system 150 may cause the NRC to perform a handover operation for the mobile device 110 from the macro cell site 120 to the small cell site 125 in advance of the mobile device 110 performing a predicted or intended content streaming operation that streams content from the content provider 140 over the network 130 and to the mobile device 110 via the small cell site 125. In some cases, the NRC may include some or all aspects of the system 150. Other ways of increasing bandwidth to provide increased QoS can include switching to another, higher bandwidth protocol (e.g. from 3G to 802.11ad), or aggregating multiple channels together.

FIG. 1 and the discussion herein provide a brief, general description of a suitable computing environment 100 in which the traffic steering system 150 can be supported and implemented. Although not required, aspects of the traffic steering system 150 are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

In some embodiments, the user device 110 and/or the cell sites 120, 125 may include network communication components that enable the devices to communicate with remote servers or other portable electronic devices by transmitting and receiving wireless signals using a licensed, semi-licensed, or unlicensed spectrum over communications network, such as network 130. In some cases, the communication network 130 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The communications network 130 may also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other communications network. Thus, the user device is configured to operate and switch among multiple frequency bands for receiving and/or transmitting data.

Further details regarding the operation and implementation of the traffic steering system 150 will now be described.

Examples of Pre-Steering Traffic for a Telecommunications Network

Figure 2:
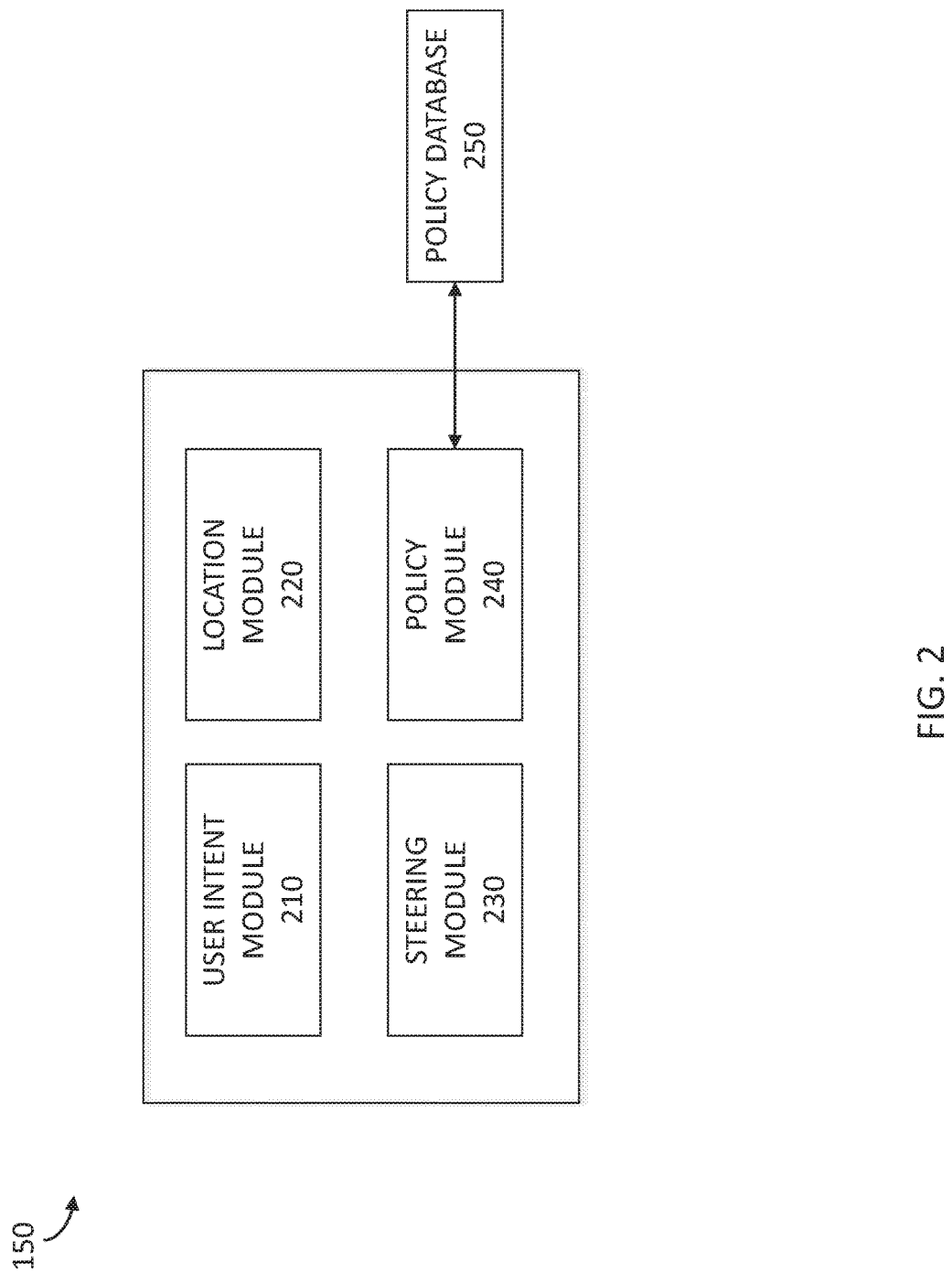
FIG. 2 is a block diagram illustrating components of a traffic steering system.

FIG. 2 is a block diagram illustrating components of the traffic steering system 150. The traffic steering system 150 may include functional modules that are implemented with a combination of software (e.g., executable instructions, or computer code) and hardware (e.g., at least a memory and processor). Accordingly, as used herein, in some examples a module is a processor-implemented module or set of code and represents a computing device having a processor that is at least temporarily configured and/or programmed by executable instructions stored in memory to perform one or more of the particular functions that are described herein. For example, the traffic steering system 150 may include a user intent module 210, a steering module 220, a location module 230, and a policy module 240.

In some embodiments, the user intent module 210 is configured and/or programmed to receive a message from a user device identifying an intended operation to be performed by the user device. For example, the user intent module 210 may receive a message from the user device 110 that indicates a user associated with a mobile device has selected a mobile application of the mobile device via which the user has previously streamed content from one or more content providers to the mobile device via the telecommunications network.

The user intent module 210, in some cases, receives various different data or information within the message from the user device 110. For example, the message may identify a mobile application or other component intended to be used by a user associated with the user device 110, device type information for the user device 110, predicted duration or time window associated with the intended operation identified by the message, and so on.

In some embodiments, the location module 220 is configured and/or programmed to obtain information identifying a predicted geographical location of the user device during performance of the intended operation. For example, the location module 220 may obtain information that indicates the mobile device 110 is predicted to stay within the geographical location during the use of the mobile application, such as during a time window that begins upon commencement of the performance of the operations and ends upon a predicted conclusion or ending of the performance of the operation.

In some embodiments, the steering module 230 is configured and/or programmed to identify a frequency band provided by the telecommunications network suitable for providing a certain or minimum quality of service (QoS) to the user device during performance of the intended operation at the predicted geographical location, and cause a handover of the user device to be performed from a current frequency band via which the user device is connected to the telecommunications network to the identified frequency band that is suitable to provide the certain quality of service to the user device during the performance of the intended operation.

The steering module 230 may identify a microcell, femtocell, picocell, WiFi access point, or other small or low power cell site 125 configured to provide access to the telecommunications network 130 using the identified frequency band at the current geographical location at which the mobile device 110 is located. In pre-steering traffic for the network 130, the steering module 230 causes a handover of the user device 110 (e.g., connection to the user device 110) from the current frequency band to the identified frequency band before the user device 110 commences performance of the intended operation.

For example, the steering module 230, therefore, causes the NRC to perform a handover of the user device 110 from a base station (e.g., macro cell site 120) providing access to the telecommunications network 130 over the current frequency band with a first quality of service to a femtocell (e.g., small cell site 125) that provides access to the telecommunications network 130 over the identified frequency band with a second quality of service that is higher than the first quality of service. For example, the mobile device may switch from communicating over 4G/LTE frequency bands to 60 GHz bands under IEEE 802.11ad/ay.

As described herein, the quality of service may refer to accessibility, availability, coverage, available bandwidth, reliability, or other network performance metrics or parameters for the network 130. Thus, in some cases, the traffic steering system 150 may recognize the user device 110 is going to be stationary and perform a streaming or other data intensive operation, and steer the network traffic associated with the operation to the small cell site 125 or other cell site that is currently or predicted to be underused by other devices, such as one or more main base stations providing coverage to the geographical location.

In some embodiments, the policy module 240 is configured and/or programmed to store, query, or access, from or via a policy database 250, one or more policies that map quality of service parameters to provide to the user device 110 with operations intended to be performed by the user device. For example, the steering module 230 may query the policy module 240 to determine the certain quality of service (QoS) to provide to the user device 110 during performance of the intended operation.

The policy module 240 accesses and analyzes various policies within the policy database 250, which may be located at or with the network resource controller. Example policies may include policies that identify one or more small cell sites 125 at which certain traffic types are to be steered, current or dynamic performance thresholds for cell sites eligible to receive pre-steered traffic, and so on.

Figure 3:
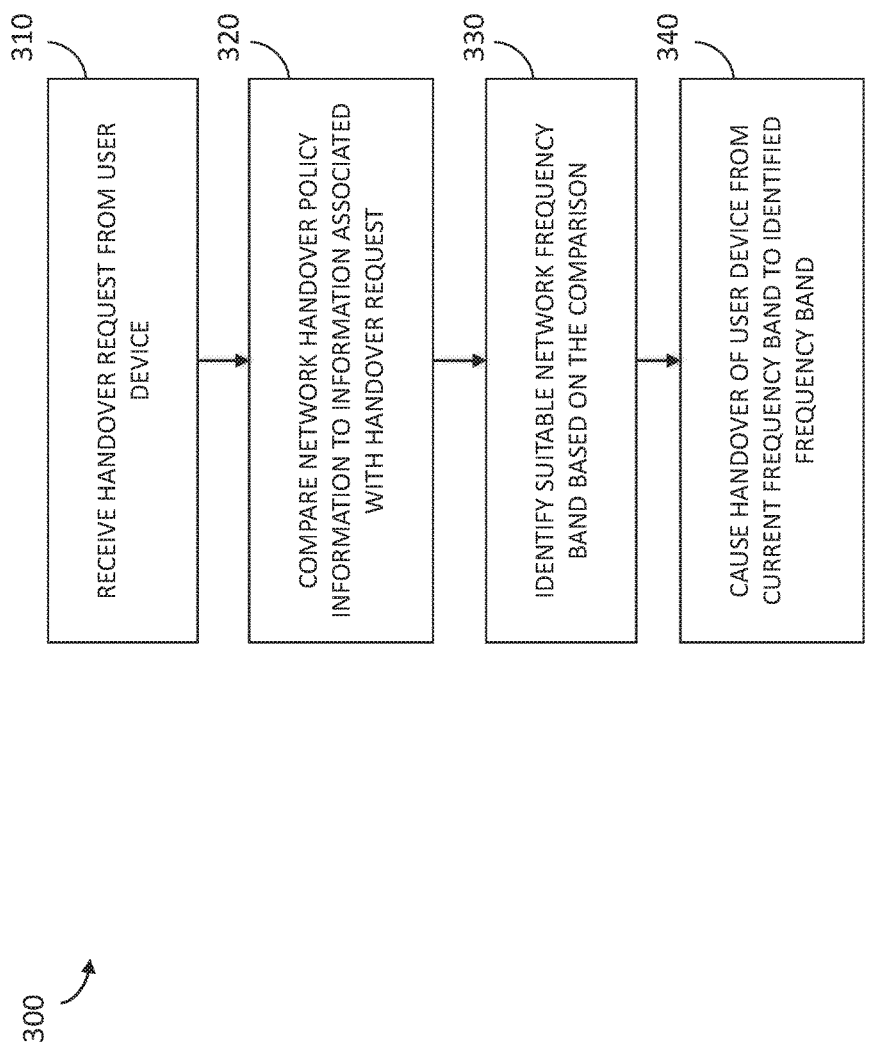
FIG. 3 is a flow diagram illustrating a method for steering traffic within a telecommunications network.

The traffic steering system 150, therefore, performs various operations, methods, or processes for steering traffic within the telecommunications network 130 in advance of certain uses of the network 130, such as content streaming, data transfers, audio/video communications, and so on. FIG. 3 is a flow diagram illustrating a method 300 for steering traffic within a telecommunications network. The method 300 may be performed by the traffic steering system 150 and, accordingly, is described herein merely by way of reference thereto. It will be appreciated that the method 300 may be performed on any suitable hardware.

In operation 310, the traffic steering system 150 receives a message (e.g., a handover or steering request) from the user device 110 identifying an intended operation to be performed by the user device 110. For example, the user intent module 210 may receive a message from the user device 110 that indicates a user associated with a mobile device has selected a mobile application of the mobile device via which the user has previously streamed content from one or more content providers to the mobile device via the telecommunications network.

In some cases, the user device 110 may determine the intended operation based on other actions performed by the user. For example, the user may orient the device in a certain physical configuration, indicating the user is about to watch or otherwise consume content. Further, the user device 110 may detect input of headphones, pairing of the device to display peripherals, or other actions that indicate the user is predicted to utilize his/her device for certain operations, such as streaming content, transferring large amounts of data, audio or video communications, and so on.

In some embodiments, the user device 110, or operating system of the user device 110, may include policies and associated components configured to send messages to the network 130 in order to cause steering of the user device 110 to suitable access sites before performance of certain operations by the device 110.

Figure 4:
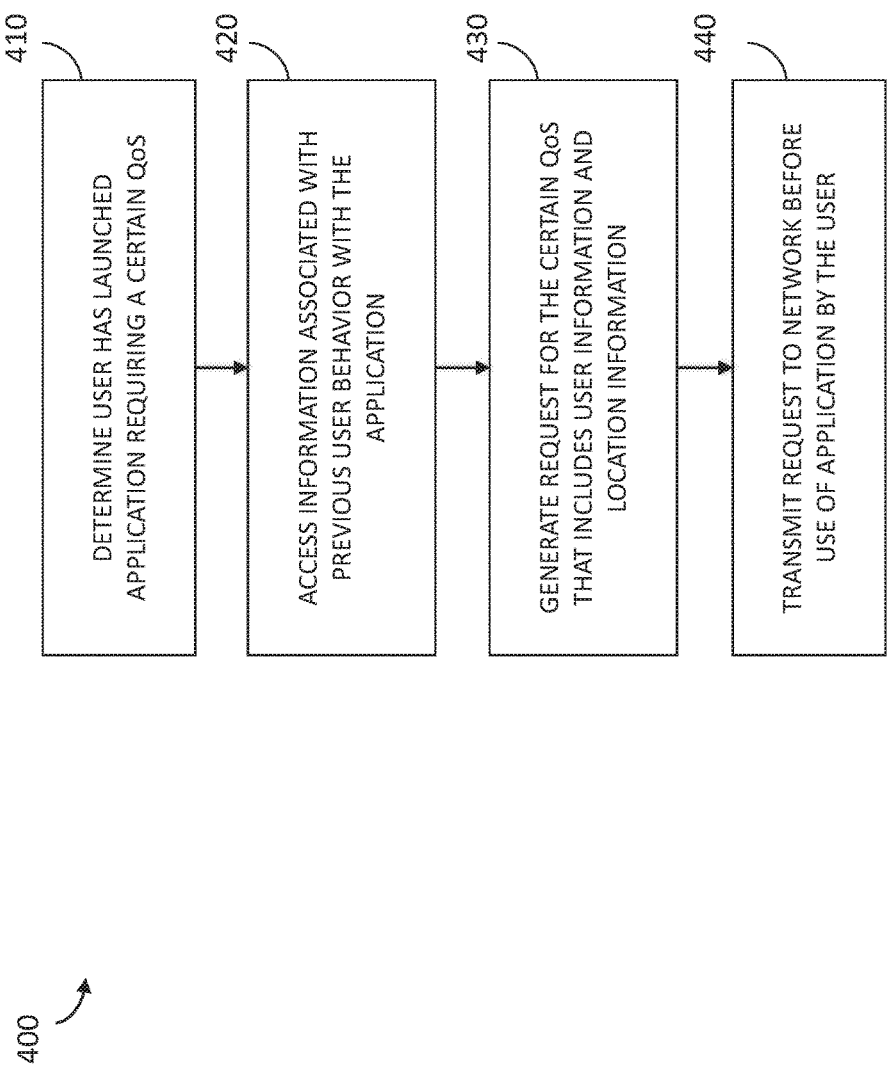
FIG. 4 is a flow diagram illustrating a method for requesting a network frequency band having a certain quality of service (QoS) for an intended application.

FIG. 4 is a flow diagram illustrating a method 400 performed by the user device 110 for requesting a network frequency band having a certain quality of service (QoS) for an intended application. The method 400 may be performed by the user device 110 (or, OS of the device 110) and, accordingly, is described herein merely by way of reference thereto. It will be appreciated that the method 400 may be performed on any suitable hardware.

In operation 410, the user device 110, such as a mobile device, determines a user associated with the mobile device has launched a mobile application of the mobile device that performs operations requiring a certain network quality of service (QoS). For example, the mobile device identifies a mobile application, such as an application associated with a streaming video service (e.g., Netflix, Hulu, and so on) selected or launched by the user.

In operation 420, the user device 110 accesses information stored within a database of the device that identifies operations previously performed by the mobile application. For example, the device 110 may access a dynamic policy that tracks application types to operations performed by the device, as well as one or more policies that map required or optimal quality of service parameters to application types, user behaviors or intents, and so on.

In operation 430, the user device 110 generates a message to send to the telecommunications network 130 that includes a request to provide a frequency band to the mobile device having the certain network quality of service. For example, the device 110 may generate a "future_svc_need" message" that includes information associated with the intended operation, as well as other information, such as location information, user information, and so on.

In operation 440, the user device 110 sends the message to the telecommunications network 130 before commencing performance of the operations via the mobile application. Therefore, before the user device 110 begins streaming content or performing other data intensive operations, the device 110 sends the message to the network 110 to cause handover of the device 110 to a frequency band suitable for performing the data operations without typical network drawbacks, such as streaming interruptions when content is initially delivered.

Referring back to FIG. 3, the traffic steering system 150, in operation 320, identifies a frequency band provided by the telecommunications network suitable for providing a certain quality of service (QoS) to the user device during performance of the intended operation, and, in operation 330, identifies a frequency band based on the comparison. For example, the policy module 240 may access and analyze various policies within the policy database 250, which may be located at or with the network resource controller, in order to identify available resources for pre-steering.

In operation 340, the system 150 causes a handover of the user device to be performed from a current frequency band via which the user device 110 is connected to the telecommunications network to the identified frequency band that is suitable to provide the certain quality of service to the user device 110 during the performance of the intended operation.

For example, the steering module 230, via the policy module 240, may identify a frequency band provided by the telecommunications network suitable for providing a certain quality of service (QoS) to the user device 110 during performance of the intended operation at the predicted geographical location, and cause a handover of the user device to be performed from a current frequency band via which the user device is connected to the telecommunications network to the identified frequency band that is suitable to provide the certain quality of service to the user device during the performance of the intended operation.

Thus, in some embodiments, the traffic steering system 150 pre-steers traffic between cell sites 120, 125 in order to provide the user device 110 with an optimal or suitable access site for performing certain traffic operations, such as content streaming (e.g., streaming of video from the content provider 140), data transfers (e.g., downloading of large image files from the cloud-based data repository 145), and so on, before commencement of the performance of the operations.

Figure 5:
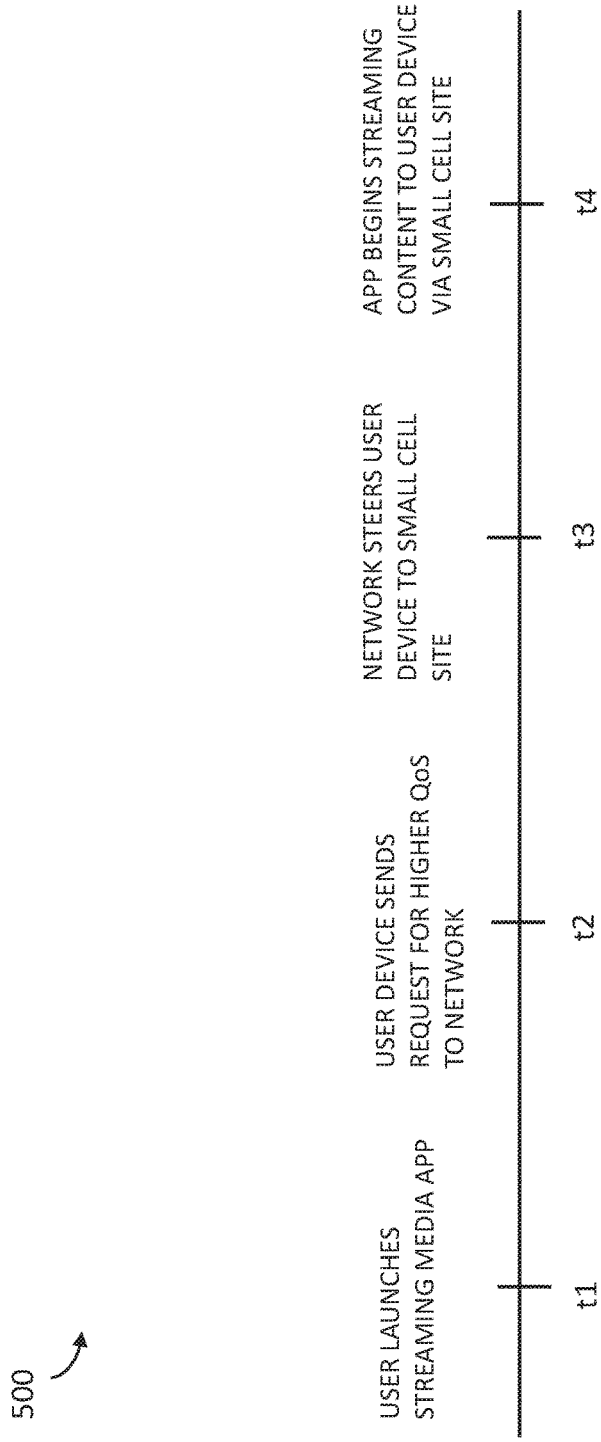
FIG. 5 is a diagram illustrating a sequence of operations for providing content to a user device associated with a user.

As an example, FIG. 5 depicts a sequence, or timeline, of operations for providing content to a user device associated with a user. At a time t1, a user launches a streaming media application on his mobile device. At a time t2, the device, following the operations of FIG. 4, sends a message to the network 130 to request a certain or high quality of service for an intended video streaming operation.

At a time t3, the network 130, following the operations of FIG. 3, steers the device to the small cell site 125, which provides sufficient bandwidth and availability to perform the intended streaming operation. Then, at a time t4, the streaming media application commences streaming media to the device via the frequency band accessed by the device via the small cell site.

Thus, the network 130 pre-steers the device to the small cell site (and from a previous macro cell site via which the device was connected to the network 130) in advance of the beginning of the media stream to the device.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A system for pre-steering traffic in a telecommunications network, the system comprising:
at least one hardware computer, wherein the computer is configured to execute software modules, including:
a user intent module that receives a message from a user device identifying an intended operation to be performed by the user device via a mobile application of the user device that has previously provided content from one or more content providers to the user device via the telecommunications network;
a location module that obtains information that indicates the user device is predicted to stay within a predicted geographical location during performance of the intended operation via the mobile application; and
a steering module that:
identifies a frequency band provided by a microcell of the telecommunications network suitable for providing a certain quality of service (QoS) to the user device during performance of the intended operation at the predicted geographical location; and
causes a handover of the user device to be performed from a current frequency band provided by a macrocell via which the user device is connected to the telecommunications network to the microcell providing the identified frequency band that is suitable to provide the certain quality of service to the user device during the performance of the intended operation.

2. The system of claim 1, wherein the user intent module receives a message from the user device that identifies a mobile application intended to be used by a user associated with the user device and a device type for the user device.

3. The system of claim 1, wherein the steering module causes the handover of the user device from the current frequency band to the identified frequency band before the user device commences performance of the intended operation.

4. The system of claim 1, wherein the steering module causes a handover of the user device from a base station providing access to the telecommunications network over the current frequency band with a first quality of service to a femtocell that provides access to the telecommunications network over identified frequency band with a second quality of service that is higher than the first quality of service.

5. The system of claim 1, further comprising:
a policy module that stores one or more policies that map quality of service parameters to provide to the user device with operations intended to be performed by the user device;
wherein the steering module queries the policy module to determine the certain quality of service (QoS) to provide to the user device during performance of the intended operation.

6. The system of claim 1, wherein the location module obtains information that indicates the user is device is stationary and predicted to remain at the geographical location during the performance of the intended operation.

7. The system of claim 1, wherein the intended operation to be performed by the user device includes an action to stream video from a content provider to the user device via an application of the user device.

8. The system of claim 1, wherein the intended operation to be performed by the user device includes an action to transfer a large amount of data from a cloud-based data repository to the user device.

9. A method for managing traffic within a telecommunications network, the method comprising:
receiving a message from a user device identifying an intended operation to be performed by the user device via a mobile application of the user device that has previously provided content from one or more content providers to the user device via the telecommunications network;
obtaining information that indicates the user device is predicted to stay within a predicted geographical location during performance of the intended operation by the user device;
identifying a frequency band or bandwidth provided by the telecommunications network suitable for providing a certain quality of service (QoS) to the user device during performance of the intended operation; and
causing a transfer of the user device to be performed from a current frequency band provided by a macrocell via which the user device is connected to the telecommunications network to the identified frequency band or bandwidth that is suitable to provide the certain quality of service to the user device during the performance of the intended operation,
wherein the identified frequency band or bandwidth is provided by a small cell site of the telecommunications network associated with the predicted geographical location.

10. The method of claim 9, wherein receiving a message from a user device identifying an intended operation to be performed by the user device includes receiving a message from the user device that indicates a user associated with a mobile device has selected a mobile application of the mobile device via which the user has previously streamed content from one or more content providers to the mobile device via the telecommunications network, and wherein the telecommunications network includes at least one 4G wireless wide-area network (WWAN) and at least one IEEE 802.11ad/ay wireless local-area network (WLAN).

11. The method of claim 9, further comprising:
determining the user device is predicted to stay within a current geographical location during performance of the intended operation;
wherein the identified frequency band is provided by a small cell site configured to provide access to the telecommunications network using the identified frequency band at the current geographical location at which the mobile device is located.

12. The method of claim 9, wherein receiving a message from a user device identifying an intended operation to be performed by the user device includes receiving a message from the user device that identifies a mobile application intended to be used by a user associated with the user device and a device type for the user device.

13. The method of claim 9, wherein causing a transfer of the user device to be performed includes causing a handover of the user device from the current frequency band to the identified frequency band before the user device commences performance of the intended operation.

14. The method of claim 9, wherein causing a transfer of the user device to be performed includes causing a handover of the user device from a base station providing access to the telecommunications network over the current frequency band with a first quality of service to a femtocell, picocell, or microcell that provides access to the telecommunications network over identified frequency band with a second quality of service that is higher than the first quality of service.

15. The method of claim 9, further comprising:
storing one or more policies that map quality of service parameters to provide to the user device with operations intended to be performed by the user device;
wherein identifying a frequency band provided by the telecommunications network suitable for providing a certain quality of service (QoS) to the user device during performance of the intended operation includes querying the one or more policies to determine the certain quality of service (QoS) to provide to the user device during performance of the intended operation.

16. The method of claim 9, wherein the intended operation to be performed by the user device includes an action to stream video from a content provider to the user device via an application of the user device.

17. The method of claim 9, wherein the intended operation to be performed by the user device includes an action to transfer a large amount of data from a cloud-based data repository to the user device.

18. At least one non-transitory computer-readable medium carrying instructions, which when executed by at least one processor, performs a method for managing traffic within a telecommunications network, the method comprising:
receiving a message from a user device identifying an intended operation to be performed by the user device via a mobile application of the user device that has previously provided content from one or more content providers to the user device via the telecommunications network;
obtaining information that indicates the user device is predicted to stay within a predicted geographical location during performance of the intended operation by the user device;
identifying a frequency band or bandwidth provided by the telecommunications network suitable for providing a certain quality of service (QoS) to the user device during performance of the intended operation; and causing a transfer of the user device to be performed from a current frequency band provided by a macrocell via which the user device is connected to the telecommunications network, to the identified frequency band or bandwidth that is suitable to provide the certain quality of service to the user device during the performance of the intended operation, wherein the identified frequency band or bandwidth is provided by a small cell site of the telecommunications network associated with the predicted geographical location.

19. The computer-readable medium of claim 18, wherein receiving a message from a user device identifying an intended operation to be performed by the user device includes receiving a message from the user device that indicates a user associated with a mobile device has selected a mobile application of the mobile device via which the user has previously streamed content from one or more content providers to the mobile device via the telecommunications network, and wherein the telecommunications network includes at least one 4G wireless wide-area network (WWAN) and at least one IEEE 802.11ad/ay wireless local-area network (WLAN).

* * * * *